United States Patent
December

(10) Patent No.: US 6,342,144 B1
(45) Date of Patent: Jan. 29, 2002

(54) CURED MULTILAYER COATING AND PROCESSING FOR ITS PRODUCTION

(75) Inventor: Timothy S. December, Rochester, MI (US)

(73) Assignee: BASF Aktiengesellschaft, Southfield, MI (US)

( * ) Notice: Subject to any disclaimer, the term of this patent is extended or adjusted under 35 U.S.C. 154(b) by 0 days.

(21) Appl. No.: 09/464,432

(22) Filed: Dec. 15, 1999

(51) Int. Cl.$^7$ .............................................. C25D 13/00
(52) U.S. Cl. ........................ 204/488; 204/486; 204/484
(58) Field of Search ........................... 204/484, 486–488

(56) References Cited

U.S. PATENT DOCUMENTS

| | | | |
|---|---|---|---|
| 3,998,716 A | 12/1976 | Masar et al. | 204/181 |
| 4,619,746 A | 10/1986 | Delaney et al. | 204/181.1 |
| 4,761,212 A | * 8/1988 | Watanabe et al. | 204/486 |
| 5,229,210 A | 7/1993 | Kasukawa et al. | 428/416 |
| 5,376,457 A | 12/1994 | Smith | 204/181.1 |
| 5,389,406 A | 2/1995 | Doebler et al. | 204/181.1 |
| 5,507,928 A | 4/1996 | Böhmert et al. | 204/488 |
| 5,635,251 A | 6/1997 | Oda et al. | 427/407.1 |
| 5,869,198 A | 2/1999 | Erne et al. | 204/488 |

OTHER PUBLICATIONS

International Search Report for IN–5359, PCT/US 00/30560, and Jun. 11, 2000 pages 4.

* cited by examiner

Primary Examiner—Kishor Mayekar
(74) Attorney, Agent, or Firm—Mary E. Golota

(57) ABSTRACT

The invention provides a cured multilayer coating having improved properties and a process for the production of said cured multilayer coating. In particular, the invention provides a method of making a cured multilayer coating which comprises applying by electrophoretic deposition a first curable coating composition (I) to a substrate, the first curable coating composition (I) comprising (a) a compound comprising one or more active hydrogen-containing groups, and (b) a curing agent comprising one or more groups reactive with active hydrogen-containing groups, applying a second curable coating composition (II) to the applied first curable coating composition (I) while the applied first curable coating composition is in an uncured state, the second curable composition (II) comprising (a) a compound comprising one or more active hydrogen-containing groups, and (b) a curing agent comprising one or more groups reactive with active hydrogen-containing groups, and subjecting the applied first and second curable coating compositions to conditions sufficient to cause curing of both compositions, wherein curing agent (I)(b) is reactive with compound (II)(a) and curing agent (II)(b) is reactive with compound (I)(a) under the applied cure conditions.

13 Claims, No Drawings

CURED MULTILAYER COATING AND PROCESSING FOR ITS PRODUCTION

FIELD OF THE INVENTION

The invention relates to multilayer films or cured multilayer coatings and a process for the production of such. More particularly, the invention relates to multilayer films having a first layer applied by electrophoretic deposition processes and a second layer applied thereto wet-on-wet, followed by a joint and simultaneous curing of the first and second layers.

BACKGROUND OF THE INVENTION

Automotive manufacturers have traditionally relied upon electrophoretically deposited coatings, both cathodic and anodic, for significant protection against corrosion of the underlying metal automotive body. "Electrocoat" as used herein may refer to both curable coating compositions used in electrophoretic deposition processes and to cured coating films obtained from the curing of coating compositions applied by electrophoretic deposition processes.

During electrodeposition, an ionically-charged polymer having a relatively low molecular weight is deposited onto a conductive substrate by submerging the substrate in an electrocoat bath having dispersed therein the charged resin, and applying an electrical potential between the substrate and a pole of opposite charge, usually a stainless steel electrode. This produces a relatively soft coating of low molecular weight on the substrate. Traditionally, this coating is converted to a hard high molecular weight coating by curing or crosslinking of the resin, usually upon exposure to elevated temperatures prior to any further application of subsequent coating layers.

However, automotive manufacturers have long desired to either lower the temperature required to cure the electrodeposited coating or to eliminate such a separate curing step all together. In particular, automotive manufacturers would like to use electrodeposited coatings as the first part of a wet-on-wet process. It will be appreciated that "wet-on-wet" typically refers to a coating application process wherein subsequent coatings are applied directly to a substantially uncured previously applied coating. The two or more uncured coatings are then jointly baked or cured. "Wet-on-wet" may encompass processes wherein the first coating is subjected to conditions which eliminate solvent and/or reduce the volume of the first film, but stop short of complete cure or crosslinking.

The elimination of the separate bake step following application of a traditional electrocoat composition would result in significant energy and space savings, due to the elimination of an entire baking oven.

Thus, it is desirable to provide a multilayer film composition having optimum performance properties which is at least partially obtained through the application of a curable basecoat, primer or sealer coating directly onto a substantially uncured or "wet" previously electrodeposited coating, followed by the joint or simultaneous curing of both the wet electrodeposited coating and the wet basecoat, primer or sealer coating.

The prior art has long attempted to provide methods to make such cured multilayer coating or film compositions and/or coating compositions for use in said methods.

For example, U.S. Pat. No. 3,998,716, Masar et al., discloses thermosetting coatings wherein multiple coats of thermosetting organic coating material, including a topcoat of powder paint are cured by employing a single baking step.

U.S. Pat. No. 5,507,928, Böhmert et al., discloses a process for the production of multi-layer lacquer coatings by electrophoretic deposition of a first coating layer of a first aqueous coating composition onto an electrically conductive substrate, application of a second coating layer based on a second, powder coating composition and joint baking of the coating layers so obtained, which process is characterized in that a powder coating composition is used for the second layer which is based on binders which contain no diene-based polymer units, wherein the coating composition is selected such that the minimum baking temperature range of the second coating layer is above that of the first coating layer or overlaps with this range in such a manner that the lower limit of the range of the second coating layer is above the lower limit of the range of the first coating layer.

However, the use of a powder coating composition as the second applied coating is not always desirable.

U.S. Pat. No. 5,376,457, Smith, discloses a process of applying a finish to an electrically conductive vehicle body wherein an electrocoated coating is dehydrated to a state of sufficient dryness to permit spray application of a water-based primer while maintaining the coat cool enough to avoid fusing the electrocoat coating. The electrocoat and subsequently spray applied water-based primer are then concurrently baked so as to "fuse both of them".

In U.S. Pat. No. 5,869,198, Erne et al., a process is disclosed for the multi-layer coating of electrically conductive substrates by the electrophoretic deposition of a first coating layer comprising an electrophoretic deposition of a first coating layer comprising an electrophoretically depositable aqueous coating medium, and the subsequent application of further coating layers, which is characterized in that a second coating layer comprising a first color- and/or effect imparting base lacquer coating medium is applied wet-into-wet to the first coating obtained by electrophoretic deposition, and the first and second coating layers thus obtained are jointly stoved, whereupon a third coating layer comprising a second color- and/or effect-imparting base lacquer coating medium is applied and a fourth coating layer comprising a clear lacquer coating medium is applied wet-into-wet thereto and the third and fourth coating layers are stoved jointly, wherein the total dry coat thickness (the sum of the coat thickenesses) of the second and third coating layers produced from the base lacquer coating media is between 15 and 40 $\mu$m, and the proportion of the second coating layer is between 20 and 50% of the total dry coat thickness of the second and third coating layers.

U.S. Pat. No. 4,619,746, Delaney et al., discloses a process for applying a non-electrophoretic top-coating over an electrophoretically applied base coating and curing the composite coating by employing a single curing step. Isocyanates, and most preferably blocked isocyanates, are the preferred curing agent for the electrophoretically applied basecoat and the non-electrophoretic topcoating composition.

However, the use of isocyanate curing agents, particularly blocked isocyanate curing agents, is no longer favored, especially in electrocoat compositions. Blocked polyisocyanates require high temperatures (e.g., 176° C. or more) to unblock and begin the curing reaction. The resulting coating can also be susceptible to yellowing. Moreover, the volatile blocking agents released during cure can cause other deleterious effects on various coating properties, as well as increasing VOC. In addition, use of some of the volatile blocking agents may give rise to environmental concerns. Finally, the volatile blocking agents account for significant and disadvantageous weight loss upon crosslinking.

U.S. Pat. No. 5,389,406, Doebler et al., describes a process for producing multilayer coatings in which a first coating layer of a first aqueous coating medium is applied to an electrically conducting substrate by electrophoretic deposition, is provided wet-in-wet with a second coating layer of a second aqueous coating medium, followed by joint stoving, wherein a coating medium based on one or more vehicles stabilized by ionic groups and which crosslink on stoving with the formation of urethane groups is used for the second coating layer, and the coating media are selected so that the maximum pigment/vehicle weight ratio of the first coating medium is 1:1, that the ratio of the pigment/vehicle weight ratio of the first coating medium to that of the second coating medium is up to 1.8, and the minimum stoving temperature interval of the second coating layer is above that of the first coating layer or overlaps the latter so that the lower limit of the interval for the second coating layer is above the lower limit of the interval for the first coating layer.

However, none of these prior art patents have resolved the above noted problems. In particular, the prior art has failed to provided cured multilayer films having the desired performance properties.

It is believed that the failings of the prior art are attributable at least in part to the prior art's failure to recognize the underlying factors addressed by the instant invention. In particular, the prior art has failed to address the fact that cationic electrocoat compositions and acid catalyzed aminoplast cured basecoats, sealers and/or primers are the coatings of choice for many automotive manufacturers and suppliers. However, the wet-on-wet application of the acidity catalyzed aminoplast based coatings onto the highly basic cationic amine functional resins has been found to result in an incompatible interrelationship. While not wishing to bound to a particular theory, it is believed that the basic amines of the cationic coatings inhibit the cure of subsquently applied aminoplast cured coatings. The instant invention recognizes this aspect and thus provides unexpected advanatages.

It is an object of the invention to provide a multilayer film composition having optimum performance properties which is at least partially obtained through the application of a curable basecoat, primer or sealer coating directly onto a substantially uncured or "wet" previously electrodeposited coating, followed by the joint or simultaneous curing of both the wet electrodeposited coating and the wet basecoat, primer or sealer coating.

It is another object of the invention to provide a commercially advantageous method of making a cured multilayer film composition wherein a second coating layer is applied wet-on-wet to a previously applied electrophoretically deposited first coating layer and both layers are jointly cured to provide a cured film.

It is a further object of the invention to provide such a method which does not rely on the use of isocyanates or blocked isocyanates and which can utilize commerically desirable cationic electrocoat compositions as well as commercially desirable aminoplast cured basecoats, sealers and/or primers.

Finally, it is an object of the invention to provide cured multilayer coating compositions (also referred to as multilayer films herein) which are produced by the methods of the invention.

SUMMARY OF THE INVENTION

It has unexpectedly been found that the foregoing objects may be achieved with the method of the invention. Accordingly, the invention provides a method of making a cured multilayer coating, the method comprising applying by electrophoretic deposition a first curable coating composition (I) to a substrate, the first curable coating composition (I) comprising, (a) a compound comprising one or more active hydrogen-containing groups, and (b) a curing agent comprising one or more groups reactive with active hydrogen-containing groups, applying a second curable coating composition (II) to the applied first curable coating composition (I) while the applied first curable coating composition is in an uncured state, the second curable composition (II) comprising (a) a compound comprising one or more active hydrogen-containing groups, and (b) a curing agent comprising one or more groups reactive with active hydrogen-containing groups, and subjecting the applied first and second curable coating compositions to conditions sufficient to cause curing of both compositions, wherein curing agent (I)(b) is reactive with compound (II)(a) and curing agent (II)(b) is reactive with compound (I)(a) under the applied cure conditions.

The invention further provides a multilayer film composition comprising (I) a first film resulting from the curing of a first curable coating composition (I) comprising (a) a compound comprising one or more active hydrogen-containing groups, and (b) a curing agent comprising one or more groups reactive with active hydrogen-containing groups, and (II) a second film resulting from the curing of a a second curable coating composition (II) comprising (a) a compound comprising one or more active hydrogen-containing groups, and (b) a curing agent comprising one or more groups reactive with active hydrogen-containing groups, wherein (1.) the second curable coating composition (II) was applied to the first curable coating composition (I) while the first curable coating composition (I) was in an uncured state, and (2.) curing agent (I)(b) was reactive with compound (II)(a) and curing agent (II)(b) was reactive with compound (I)(a) in the conditions in which the first and second curable coating compositions where cured.

DETAILED DESCRIPTION OF THE PREFERRED EMBODIMENT

The instant invention requires the use of a first curable coating composition (I) and a second curable coating composition (II). Both coating compositions will comprise a compound (a) comprising one or more active hydrogen-containing groups, and a curing agent (b) comprising one or more groups reactive with the active hydrogen-containing groups of the compounds (I)(a) and (II)(a).

It is a necessary aspect of the instant invention that curing agent (I)(b) be reactive with compound (II)(a) under the cure conditions which are applied to jointly cure curable coating composition (I) and curable coating composition (II). It is also necessary that curing agent (II)(b) be reactive with compound (I)(a) under the same applied cure conditions. While it is not necessary that curing agent (I)(b) and curing agent (II)(b) be identical, it is preferred that both curing agents operate using the same curing mechanism. As used herein, the term "curing mechanism" refers to the addition or condensation reaction between components (a) and (b) that results in a crosslinked network. Put another way, curing agent (I) must be such that it would cure curable coating composition (II) under the applied cure conditions, if it were substitued in place of curing agent (II). Similarly, curing agent (II) must be such that it would cure curable coating composition (I) under the applied cure conditions, if it were substituted in place of curing agent (I).

In a preferred embodiment, the curable coating compositions (I) and (II) will both further comprise a catalyst (c)

for the reaction between reactive compound (a) and curing agent (b), wherein the catalyst (I)(c) is also a catalyst for the reaction between reactive compound (II)(a) and curing agent (II)(b), and the catalyst (II)(c) is also a catalyst for the reaction between reactive compound (I)(a) and curing agent (I)(b). The phrase "is also a catalyst for" is meant to indicate that said material changes the speed of the noted reaction as well as the reaction for which it is originally intended to be catalytic, but is present in its original concentration at the end of the reaction. (It will be appreciated that concentration of catalyst refers only to unblocked catalyst in the case of blocked catalysts.) That is, catalyst (I)(a) will, under the applied curing conditions, change the speed of the reaction (I)(a)+(I)(b), as well as change the speed of the reaction (II)(a)+(I)(b). Likewise, catalyst (II)(c) will, under the applied curing conditions, change the speed of the reaction (II)(a)+(II)(b), as well as change the speed of the reaction (I)(a)+(I)(b).

In a most preferred embodiment, the curing agents (I)(b) and (II)(b) will be the same and will not be a polyisocyanate.

These and other aspects of the invention will be described in detail below.

Per the method of the invention, the curable coating composition (I) must be suitable for application by an electrophoretic deposition process. Suitable coating compositions (I) may be either anodic or cathodic/cationic coating compositions. It will be appreciated that cured films produced by such electrophoretic deposition processes are referred to as electrocoat coatings or e-coat and are typically used as a first applied primer coat for protection against corrosion.

Curable coating composition (I) will comprise a compound (a) comprising one or more active hydrogen groups and at least one or more ionic groups or groups convertible to ionic groups. The ionic groups or groups which can be converted to ionic groups may be anionic groups or groups which can be converted into anionic groups, e.g. acidic groups such as —COOH groups, or cationic groups or groups which can be converted into cationic groups, e.g. basic groups such as amino groups and ammonium groups such as quaternary ammonium groups, or phosphonium and/or sulphonium groups. Basic groups which contain nitrogen are particularly preferred. These groups may be present in quaterrised form, or are at least partially converted into ionic groups with a customary nuetralising agent such as an acid, e.g. an organic monocarboxylic acid, such as formic acid or acetic acid for example.

Examples of suitable compounds (a) for use in anodic curable coating compositions (I) include polymers which are based on polyesters, acrylics, vinyl, epoxy, polyurethane, alkyds, mixtures thereof, and the like. Thus, the one or more active hydrogen groups for suitable anodic compounds (a) may generally be selected from the groups consisting of carboxylic acid, hydroxyl, carbamate, isocyanate, amine, epoxy, acrylate, vinyl, acetoacetate mixtures thereof and the like, with hydroxyl, carbamate and mixtures thereof being preferred and hydroxyl, primary carbamate and mixtures thereof being most preferred.

Illustrative examples of suitable compounds (a) for use in anodic coating compositions (I) will have a weight average molecular weight in the range of about 300 to 100,00, preferably from 10,000 to 60,000. Weight average molcular weight can be determined by the GPC method using a polystyrene standard. Suitable compounds (a) may also be characterized by an acid number in the range of 20 to 300 mg KOH/g for example, preferably from 20 to 80, most preferably from 30 to 50.

Anodic compounds (a) will typically comprise one or more, preferably a plurality of, ionic groups which are acidic such as —COOH, —SO$_3$H and/or PO$_3$H$_2$ groups, with —COOH groups being most preferred. The anodic compounds (a) can be converted into the aqueous phase after neutralisation of at least part of the acidic groups. Neutralisation preferably occurs with amines, especially tertiary amines or alkanol amines and most preferably with teritary alkanol amines such as dimethyl ethanol amine.

Preferred compounds (a) for use in anodic coating compositions (I) are those which are obtained through the copolymerization of one or more monomers selected from the group consisting of alkyl and hydroxy alkyl esters of unsaturated organic acids, ethylencially unsaturated monomers, unsaturated organic acids and mixtures thereof. Examples of suitable alkyl and hydroxy alkyl esters of (meth)acrylic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Examples of suitable ethylenically unsaturated monomers include unsaturated m-tetramethyl xylene isocyanate (sold by American Cyanamid as TMI®), styrene, vinyl toluene, alpha methyl styrene and the like. Examples of suitable unsaturated organic acids include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred unsaturated organic acids include acrylic acid, methacrylic acid, and mixtures thereof.

A most preferred anodic compound (a) is that disclosed in pending U.S. Pat. application Ser. No. 09/217,557, filed Dec. 21, 1998 entitled "Anodic Electrocoat having a Carbamate Functional Resin", now U.S. Pat. No. 6,214,188, all of which is hereby incorporated by reference. Such an anodic compound (a) will have at least one carbamate functional group appended to a polymer backbone, preferably a plurality of pendant carbamate functional groups.

Illustrative examples of the most preferred anodic compounds (a) suitable for use in the instant invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126, 747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. However, such ethylenically unsaturated monomers must comprise at least one monomer having a pendant carboxylic acid group.

For example, preferred methods of preparing illustrative examples of the anodic compound (a) most preferred for use in the instant invention include the following. One or more carbamate functional monomers such as 2-carbamate ethyl methyacrylate (CEMA) may be copolymerized with two or more monomers such as an unsaturated organic acid and a alkyl ester of an unsaturated organic acid in the presence of a suitable initiator such as an azo or peroxide initiator. Other suitable carbamate functional monomers include those described above. Suitable unsaturated organic acids will be of the formulas $R^1R^2=R^3COOH$ or $R^1R^2=R^3R^4COOH$, where $R^1$, $R^2$, $R^3$, and $R^4$ may be the same or different and are selected from the group consisting of H, alkyl groups of from 2 to 12 carbons, and mixtures thereof. Examples of suitable unsaturated organic acids include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred unsaturated organic acids include acrylic acid, methacrylic acid, and mixtures thereof. Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional esters such as butyl acrylate and butylmethacrylate. Other ethylenically unsaturated monomers such as styrene may be also used.

In another reaction scheme, an isocyanate functional monomer such as unsaturated m-tetramethyl xylene isocyanate (sold by American Cyanamid as TMI®) can be copolymerized with monomers such as alkyl esters, such as described immediately above, and unsaturated monomers, such as styrene, to produce an isocyanate functional polymer. The required carboxylic acid functionality and carbamate functionality can then be grafted onto the isocyanate functional polymer by a two-stage reaction having a first stage using a carbamate functional monomer such as hydroxypropyl carbamate followed by a second stage using a carboxylic acid of the formula HO—(R)—COOH or an amine salt of the formula HO—(R)—COOH$^+$NR$_3$, wherein R is an alkyl group of from 1 to 12 carbons, preferably from 2 to 8 carbons.

Alternatively, one or more carbamate functional monomers may be reacted with an isocyanate functional monomer such as an unsaturated m-tetramethyl xylene isocyanate to produce a carbamate functional monomer. Additional isocyanate monomer may be added to introduce isocyanate functionality in the monomer mixture. After polymerizing the one or more monomers, the required pendant carboxylic acid functionality can be grafted onto the polymer backbone using a carboxylic acid functional compound having at least one group reactive with an isocyanate, such as a hydroxy carboxylic acid.

Alternatively, carbamate functional adducts made from polyisocyanate functional compounds such as IPDI or TDI and hydroxy carbamate compounds can be made and then grafted onto acrylic, epoxy or other hydroxy functional polymers having acid numbers of at least 20, preferably 30. Of course, it will be appreciated that such resins must have the characteristics required for in electrocoat compositions as discussed herein. Preferred polymers for use as the backbone of most preferred anodic compound (a) are hydroxyl functional acrylic resins with acid numbers of at least 20, preferably at least 30.

A most preferred method of making most preferred anodic compound (a) suitable for use in the instant invention involves the copolymerization of at least one carbamate functional monomer, at least one unsaturated organic acid, at least one alkyl ester of an unsaturated organic acid and at least one additional ethylenically unsaturated monomer such as styrene. A most preferred reaction scheme involves the copolymerization of CEMA, acrylic acid, styrene and butyl acrylate in the presence of an azo or peroxide initiator.

The most preferred anodic compound (a) can be represented by the randomly repeating units according to the following formula:

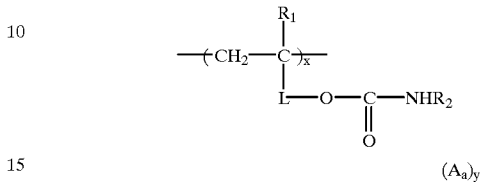

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, $A_a$ represents repeat units derived from one or more ethylenically unsaturated monomers, at least one of which repeat units must have a pendant carboxylic acid group. The at least one carboxylic acid group may derive from the use of at least one ethylenically unsaturated monomer having at least one carboxylic acid group, preferably a pendant or terminal carboxylic acid group. Alternatively, the at least one repeating unit having a pendant carboxylic acid may derive from the graft of a free organic acid to the polymer backbone of the repeating units (A), as discussed above, wherein such free organic acid has a functional group reactive with the backbone polymer.

Examples of ethylenically unsaturated monomers having a pendant carboxylic acid group include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred ethylenically unsaturated monomers having a pendant carboxylic acid are acrylic acid, methacrylic acid and mixtures there of.

Examples of free organic acids which may be used to graft a pendant carboxylic acid group to the backbone polymer include compounds of the formula HO—(R)—COOH or an amine salt of the formula HO—(R)—COOH$^+$NR$_3$, wherein R is an alkyl group of from 1 to 12 carbons, preferably from 2 to 8 carbons. Polyacids such as malic acid and citric acid may also be used. Preferred organic free acids are lactic acid, glycolic acid and stearic acid.

Other monomers which may be utilitzed to provide repeating units ($A_a$) of anodic compound (a) not having pendant carboxylic acid functionality are those monomers for copolymerization with acrylic monomers known in the art and discussed above. These include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

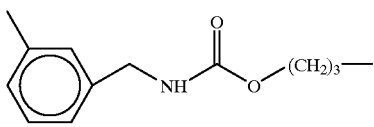

—(CH$_2$)—(CH$_2$)$_2$—, —(CH$_2$)$_4$—, and the like. In one preferred embodiment, —L— is represented by —COO—L'— where L' is a divalent linking group. Thus, in a preferred embodiment of the invention, the anodic polymer compound (a) may be represented by randomly repeating units according to the following formula:

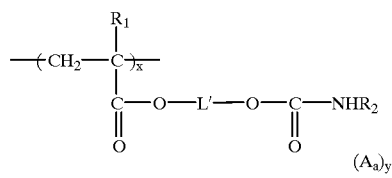

In this formula for most preferred anodic compound (a), $R_1$, $R_2$, A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. Of course, $A_a$ would still require the necessary pendant carboxylic acid groups as discussed above.

Most preferred anodic compound (a) may be further characterized by an acid number of from 20 to 80, preferably an acid number of from 30 to 50 and most preferably an acid number of from 30 to 35.

Most preferred anodic compound (a) should also have a carbamate equivalent weight (grams of polymer (a)/equivalent of carbamate) of from 150 to 1200, preferably from 200 to 600, and most preferably from 300 to 400.

However, cationic compounds (a) are most preferred for use as compound (a) in curable coating composition (I).

Examples of suitable cationic compounds (a) include resins which are based on epoxy and bisphenol A and have one or more primary, secondary, tertiary, or quaternary ammonium groups. Illustrative examples of suitable cationic compounds (a) will generally have amine numbers in the range of 0.1 to 1.0 meq. The weight average molecular weight (Mw) of such cationic compounds (a) will be from 300 to 100,000, preferably from 10,000 to 60,000.

Examples of suitable cationic compounds (a) include, without limitation, polymers and resins such as acrylic, epoxy, polyurethane, alkyd, carbamate, polyesters, vinyl, epoxy, alkyds, mixtures thereof, and the like. Thus the one or more active hydrogen groups for suitable cathodic compounds (a) may generally be selected from the groups consisting of carboxylic acid, hydroxyl, carbamate, isocyanate, amine, epoxy, acrylate, vinyl, acetoacetate, mixtures thereof and the like, with hydroxyl, carbamate and mixtures thereof being preferred and hydroxyl, primary carbamate and mixtures thereof being most preferred.

Preferred cationic compounds (a) for use in curable coating composition (I) are those containing at least one carbamate functional group and one or more repeat units having at least one pendent cationic salting site. Examples of suitable carbamate functional resins for use in cationic electrocoat compositions are described in pending U.S. patent application Ser. No. 09/217,917, filed Dec. 21, 1998, now U.S. Pat. No. 6,165,338 entitled "Cathodic Electrocoat Having a Carbamate Functional Resin" all of which is hereby incorporated by reference.

The most preferred cathodic compound (a) of the invention will have at least one carbamate functional group appended to a polymer backbone, preferably a plurality of pendant carbamate functional groups. It is preferred, but not necessary, that the polymer backbone to which the carbamate functional group is appended be an acrylic polymer.

The most preferred cathodic compound (a) can be prepared in a variety of ways.

One way to prepare such cathodic compounds (a) is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbarnate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. In a preferred embodiment, at least one of the ethylenically unsaturated monomers will have a pendant cationic salting group.

As used herein, the term "cationic salting site" refers to a functional group which is sufficiently basic to undergo reaction with an acid to produce a salt, which, while in an aqueous dispersion in the presence of a voltage, will undergo decomposition and facilitate the formation of a insoluble polymer which deposits on a substrate immersed in the aqueous dispersion. Preferred cationic salting groups are amine functional groups and quaternary ammonium salts. The amine functional groups of the polymer (a) may be primary, secondary, tertiary amino groups or quaternary ammonium salts. Quaternary ammonium salts and tertiary amines are most preferred, with quaternary ammonium salts especially preferred. Such groups may also be part of polyamines and/or alkanol amines.

The cationic salting site can be incorporated into or grafted to the cathodic compound (a) polymer backbone in a variety of ways.

For example, a carbamate functional acrylic monomer can be copolymerized with an ethylenically unsaturated monomer having at least one cationic salting group. The cationic salting group may be a primary, secondary, or tertiary amine functional group, or a quaternary ammonium salt, or a mixture thereof. Illustrative examples of such monomers are methacrylamide, acrylamide, dimethylaminoethyl methyacrylate, mixtures thereof, and the like. Another example of a suitable ethylenically unsaturated monomer having amino functionality is the reaction product of glycidyl methacrylate and a tertiary amine salt. Dimethylaminoethyl methacrylate is preferred.

Alternatively, as will be discussed below, a polymer having oxirane or glycidyl functionality can be made and the cationic salting group formed by reaction of the glycidyl group with an amine or a polyamine. Amines or polyamines may be used having primary, secondary, or tertiary amine groups. Tertiary amine salts may be used to form quaternary ammonium salts via reaction with the glycidyl group on the polymer backbone and are preferred.

Finally, a monomer such as glycidyl methacrylate can be polymerized with a ethylenically unsaturated carbamate functional monomer to produce a carbamate functional acrylic having pendent glycidyl functionality. A cationic salting site can be incorporated by reaction of an amine functional compound, polyamine, or tertiary amine salt with the oxirane group.

Preferred methods of preparing the cathodic compound (a) having an acrylic backbone include the following.

One or more carbamate functional monomers such as 2-carbamate ethyl methyacrylate (CEMA) may be copolymerized with at least one ethylenically unsaturated amine functional compound, at least one alkyl ester of an unsaturated organic acid and at least one other ethylenically unsaturated monomer such as styrene in the presence of a suitable initiator such as an azo or peroxide initiator. Other suitable carbamate functional monomers include those discussed above. Illustrative suitable unsaturated amine functional compounds are as discussed above. A preferred unsaturated amine functional compound is dimethylaminoethyl methyacrylate. Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are non-hydroxy functional monomers such as butyl acrylate and butylmethacrylate. A preferred monomer for use as an additional ethylenically unsaturated monomer is styrene.

In another reaction scheme, an adduct may be made from a polyisocyanate such as isophorone diisocyanate (IPDI) or toluene diisocyanate (TDI) and a hydroxy functional carbamate compound such as hydroxypropyl carbamate. The resulting adduct can then be grafted onto an acrylic, epoxy or other hydroxy functional resin having suitable characteristics for use.

Another method involves a multistep reaction wherein a hydroxy carbonate may reacted with ammonia or an amine functional compound to provide a primary, secondary or tertiary carbamate functional compound. This compound is then reacted with an anhydride compound via the reaction of the hydroxy group with the anhydride ring. The carboxylic acid groups of the resulting reaction product are then reacted with the oxirane groups of a glycidyl ether of Bisphenol A. Cationic salting groups are incorporated via the reaction of an amine functional compound, such as diethanol amine, with the glycidyl ether groups which terminate the resulting hydroxy and carbamate functional polymer.

In an alternative reaction, an isocyanate functional monomer such as unsaturated m-Etetramethyl xylene isocyanate (sold by American Cyanamid as TMI®) can be copolymerized with monomers such as alkyl esters such as described immediately above such as butyl acrylate and unsaturated monomers such as styrene to produce an isocyanate functional polymer. The required cationic salting group functionality and carbamate functionality can then be grafted onto the isocyanate functional polymer by a multi-stage reaction having a first stage using a carbamate functional monomer such as hydroxypropyl carbamate followed by a second stage using an amine functional compound, i.e., primary, secondary or tertiary amine groups, most preferably an alkanol amine.

In general, the most preferred cathodic compound (a) can be represented by the randomly repeating units according to the following formula:

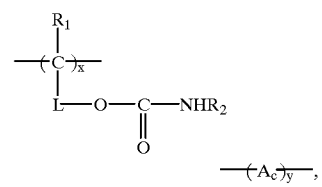

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, $A_c$ represents comprises one or more repeat unit having a pendent cationic salting site. Such repeat units may be derived from one or more ethylenically unsaturated monomers, at least one of which repeat units must have a pendent cationic salting group, preferably an amino group. As discussed above, the at least one cationic salting group may derive from the use of at least one ethylenically unsaturated monomer having at least one amino group. Alternatively, the at least one repeating unit having a pendent cationic salting site may derive from the reaction of an amine functional compound with a glycidyl group previously incorporated into the polymer.

L represents a divalent linking group and is the same as discussed above with respect to the anodic compound (a).

In an especially preferred embodiment of cathodic compound (a), cathodic compound (a) will comprise a polymer (A) which may be made via the grafting of a carbamate functional intermediate adduct (A') onto an acrylic, epoxy, or other hydroxy functional resin (A") having suitable characteristics for use as discussed below. In a most preferred reaction scheme, a carbamate functional intermediate adduct (A') may be made from the reaction of a polyisocyanate (ai) and a carbamate functional compound (aii) comprising at least one group which is reactive with isocyanate. Preferably, the compound (aii) will comprise at least one primary carbamate group.

Suitable polyisocyanates (ai) are monomeric polyisocyanates that can be aliphatic, cycloaliphatic, and/or aromatic polyisocyanates. Useful aliphatic polyisocyanates include aliphatic diisocyanates such as ethylene diisocyanate, 1,2- diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone;px diisocyanate. Useful aromatic diisocyanates and araliphatic diisocyanates include the various isomers of toluene diisocyanate, meta-xylylenediioscyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of α,α,α',α'-tetrarethyl xylene diisocyanate can be used. Biurets of isocyanates such as DESMODUR® N100 from Bayer may also be useful. Preferably, polyisocyanate (ai) is a diisocyanate. Isophorone diisocyanate is most preferred.

Suitable examples of such isocyanate reactive, carbamate functional compounds are commercially available hydroxy functional carbamate compounds such as hydroxypropyl carbamate, hydroxybutyl carbamate, and mixtures thereof. Hydroxypropyl carbamate is most preferred. It is also within the scope of the invention to use isocyanate reactive compounds containing groups convertible to carbamate in place of the isocyanate reactive, carbamate functional compounds. Use of the term "convertible to carbamate" refers to groups which have the capability of forming carbamate groups, preferably primary carbamate groups after reaction with the polyisocyanate is completed. Examples of groups convertible to carbamate include cyclic carbonate groups, (i.e., the reaction product of glycidol and $CO_2$ then reacted with ammonia to form a carbamate group), and epoxy groups (i.e., reaction of the epoxy with $CO_2$ to form cyclic carbonate followed by reaction with ammonia).

The isocyanate reactive, carbamate functional compound (aii) is reacted with the polyisocyanate (ai) to provide an intermediate compound (A') having at least one carbamate group, preferably at least one primary carbamate group, and at least one isocyanate group.

In a particularly preferred embodiment, the isocyanate reactive carbamate functional compound (aii) will be reacted with the polyisocyanate (ai) under reaction conditions sufficient to produce both the intermediate (A') having both carbamate functionality and isocyanate functionality as well as a carbamate functional reactive additive (B) which is free of isocyanate functionality. In this embodiment, both (B) and (A') are the reaction products of a single reaction. Accordingly, (B) may be described as being generated "in situ" during the production of intermediate (A'). Examples of suitable reaction conditions include a mole equivalent ratio of NCO to hydroxyl of from 2/1 to 2/2, preferably from 1.2 to 1.8, and most preferably from 1.3 to 1.7. Other reaction conditions to consider include temperature and catalyst type and level. However, it will be appreciated that in situ reactive additive (B) is an optional element with respect to the instant invention.

Suitable catalysts which may be used for the multistep production of the polymer (A) include those described below with respect to the curable coating compositions (I) and (II). Preferred catalysts are those such as Lewis acids or tin salts. A most preferred catalyst is dibutyl tin dilaurate. Preferably, the catalyst will be used in an amount of from 0.001 to 1%, and most preferably from 0.05 to 0.15%, based on solids.

In situ generated reactive additive (B) will have a number average molecular weight of from 250 to 2000 and most preferably from 400 to 800. Preferably, reactive additive (B) will have a degree of carbamate functionality equal to the degree of isocyanate functionality of polyisocyanate (ai), i.e., the polyisocyanate (ai) will preferably be diblocked for the reactive additive (B) when polyisocyanate (ai) is a diisocyanate.

The carbamate functional/isocyanate functional intermediate (A') is then grafted onto an acrylic, epoxy or other hydroxy functional resin (A") having suitable characteristics for use to form the most preferred embodiment of cathodic compound (a). The grafting of the intermediate (A') must occur via reaction with the at least one isocyanate group of (A') with a reactive group of (A").

Most preferably, the carbamate functional/isocyanate functional intermediate (A') will be grafted onto a hydroxy functional compound (A") comprising epoxy groups. The grafting of (A') will thus occur via reaction between a hydroxyl group and the at least one isocyanate group of (A'). Preferably, the hydroxy functional compound comprising epoxy groups will be an epoxy functional resin. As discussed below, reaction of the epoxy group with a tertiary amine in the presence of an acid is a preferred method of incorporating the most preferred one or more quaternary ammonium groups.

Suitable epoxy containing polymers are resinous polyepoxide or polymeric resinous materials containing two or more 1,2-epoxy groups per molecule. Preferred polyepoxides are polyglycidyl ethers of polyhydric phenols such as bisphenol A. These can be produced by etherification of a polyphenol with an epihalohydrin or dihalohydrin such as epichlorohydrin or dichlorohydrin in the presence of alkali. Suitable polyhydric phenols include bis-2,2-(4-hydroxyphenyl)propane, bis-1,1-(4-hydroxyphenyl)ethane, bis(2-hydroxynaphthyl)methane and the like.

Other useful polyepoxide compounds are those made from novolak resins or similar polyhydroxyphenol resins.

Also suitable are polyglycidyl ethers of polyhydric alcohols such as ethylene glycol, propylene glycol, diethylene glycol and triethylene glycol.

There can also be used polyglycidyl esters of polycarboxylic acids which are produced by the reaction of epichlorohydrin or a similar epoxy compound with an aliphatic or aromatic polycarboxylic acid such as succinic acid and terepthalic acid.

Most preferably, the epoxy-containing compound to which the carbamate functional intermediate is grafted onto will be the reaction product of a liquid epoxy such as diglycidyl ether of bisphenol A (DGEBA) and bisphenol A. Particularly preferred examples of such epoxy containing compounds may be characterized as upgraded epoxy resins having epoxy equivalent weights of approximately 1100. Suitable liquid epoxys are GY2600, commercially available from Ciba Geigy and Epon® 828, commercially available from Shell Chemical Company.

Thus, a most preferred cathodic compound (a) will comprise both polymer (A) and optional carbamate functional reactive additive (B) generated during the production of polymer (A), most specifically during the production of intermediate (A'). Reactive additive (B) will be present in the resin composition of the invention in an amount of from 1 to 20, preferably from 2 to 15 and most preferably from 3 to 10 percent, based on the total resin solids. The cathodic compound (a) comprising both polymer (A) and polycarbamate functional reactive additive (B) that is free of isocyanate functionality has been found to provide unexpected benefits in both application and performance.

In this most preferred embodiment of cathodic compound (a), polymer (A) comprises one or more quaternary ammonium groups which serve as cationic salting sites. While it most preferred that polymer (A) comprise one or more quaternary ammonium groups, other cationic salting groups may also be present in polymer (A). Examples of other suitable cationic salting groups are amine functional groups such as primary, secondary, tertiary amino groups or mixtures thereof.

Polymer (A) may be further characterized by a meq of cationic salting group, preferably a quaternary ammonium group, of from about 0.1 to 2.0 meq N/gram polymer (A), preferably from about 0.2 to 1.5 meq N/gram polymer (A), and most preferably from about 0.3 to 0.6 meq N/gram polymer (A). It is preferred that at least 80% of the total number of cationic salting groups be quaternary ammonium groups, more preferably from 90 to 100% of the total number of cationic salting groups, and most preferably from 95 to 100% of the total number. The remaining cationic salting groups can be as described above, with secondary amino groups being most preferred.

A preferred method of incorporating the necessary cationic salting group, i.e., a quaternary ammonium group into the polymer (A), is by reaction of a glycidyl group with one or acid salts of one or more tertiary amines. The acid salt will preferably be preformed via the mixing of one or more tertiary amines and one or more acids. Other amines or polyamines may be used having primary, secondary, tertiary amine groups, or mixtures thereof. However, it will be appreciated that quaternary ammonium groups are an especially preferred element of polymer (A) of cathodic compound (a). Suitable acids are carboxylic acids such as lactic acid and acetic acid.

Epoxy functionality will most preferably be present in polymer (A) as a result of the foregoing reaction scheme wherein an isocyanate/carbamate functional intermediate (A') is grafted onto a hydroxy/epoxy functional compound.

Alternatively, epoxy functionality can be incorporated into an acrylic resin via the polymerization of a monomer such as glycidyl methacrylate with an ethylenically unsaturated carbamate functional monomer to produce a carbamate functional acrylic having pendent glycidyl functionality. Subsequently, a cationic salting site, i.e., a quaternary ammonium compound can be incorporated by reaction of a tertiary amine with the oxirane group in the presence of an acid.

In the absence of an epoxy group, the cationic salting site can be incorporated into or grafted to the polymer (A) backbone in a variety of ways.

For example, a carbamate functional acrylic monomer can be copolymerized with an ethylenically unsaturated monomer having at least one cationic salting group. One or more carbamate functional monomers such as 2-carbamate ethyl methyacrylate (CEMA) may be copolymerized with at least one ethylenically unsaturated amine functional compound, at least one alkyl ester of an unsaturated organic acid and at least one other ethylenically unsaturated monomer such as styrene in the presence of a suitable initiator such as an azo or peroxide initiator. Other suitable carbamate functional monomers include those discussed above.

The cationic salting group of the ethylenically unsaturated monomer may be a primary, secondary, or tertiary amine functional group, or a quaternary ammonium salt, or a mixture thereof. Most preferably, the salting group will be a quaternary ammonium salt. Illustrative suitable unsaturated amine functional compounds are methacrylamide, acrylamide, dimethylaminoethyl methyacrylate, mixtures thereof, and the like. A preferred unsaturated amine functional compound is dimethylaminoethyl methacrylate.

Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional monomers such as butyl acrylate and butylmethacrylate. A preferred monomer for use as an additional ethylenically unsaturated monomer is styrene.

A preferred example of a suitable ethylenically unsaturated monomer having amino functionality is the reaction product of glycidyl methacrylate and the acid salt of a tertiary amine. Dimethylaminoethyl methacrylate is most preferred as the tertiary amine.

If curable coating composition (I) is a cationic electrocoat composition, the cationic compound (a) will be preferably reacted with an acid for use in the cathodic electrocoat coating composition of the invention. This reaction may be termed "neutralization or "acid-salted" and specifically refers to the reaction of the pendent amino groups with an acidic compound in an amount sufficient to neutralize enough of the basic amino groups to impart water-dispersibility to compound (a). Illustrative acid compounds include phosphoric acid, propionic acid, acetic acid, lactic acid, or citric acid.

Curable coating composition (I) will further comprise a curing agent (b). Curing agent (b) is a compound having a plurality of functional groups that are reactive with the active hydrogen-containing groups on compound (a). Such reactive groups include active methylol or methylalkoxy groups, isocyanate groups, siloxane groups, cyclic carbonate groups, and anhydride groups. Examples of compounds suitable for use as curing agent (b) include aminoplast resins, phenolformaldehyde adducts, blocked isocyanate curing agents, tris(alkoxy carbonylamino) triazines (available from Cytec Industries under the tradename TACT) and mixtures thereof. Aminoplast resins and phenol/fornaldehyde adducts are most preferred, with blocked isocyanates being disfavored. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble.

Suitable ionic compounds (a) and curing agent (b) intended for use in curable coating composition (I) will be dispersed in aqueous medium. The term "dispersion" as used within the context of the present invention is believed to be a two-phase translucent or opaque aqueous resinous system in which the resin is in the dispersed phase and water the continuous phase. It will be appreciated that in this case, curing agent (b) may or may not be soluble in water. The average particle size diameter of the resinous phase is about 0.05 to 5.0 microns, preferably less than 2.0 microns.

The concentration of the ionic compound (a) and curing agent (b) in the aqueous medium is, in general, not critical, but ordinarily the major portion of the aqueous dispersion is water. The aqueous dispersion of coating composition (I) will usually contain from about 3 to 50 percent, preferably 10 to 40 percent by weight resin solids. Aqueous resin concentrates which are to be further diluted with water, generally range from 10 to 30 percent by total weight solids.

The curable coating composition (I) may, and most preferably will contain one or more catalyst (c) to facilitate the reaction between compound (a) and curing agent (b). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid (DDBSA), phenyl acid phosphate, monobutyl maleate, butyl phosphate, and hydroxy phosphate ester. Other catalysts useful in the composition of the invention include Lewis acids, zinc salts, and tin salts. Illustrative Lewis acids or zinc salts are zinc nitrate, zinc acetate, bismuth octoate, dibutyltin dilaurate, and the like. Such catalysts will typically be used in an amount of from 0.1 to 3.0 weight percent, based on the resin solids, preferably from 0.5 to 2.0 weight percent, based on the resin solids. Preferred catalysts for use in curable coating composition (I) are Lewis acids such as zinc nitrate and blocked and unblocked acid catalysts such as DDBSA. It is also within the scope of the instant invention that curable coating composition (I) be catalyzted by acid available from curable coating composition (II) such as discussed below.

In an especially preferred embodiment, curable coating composition (I) will further comprise an optional reactive additive (C) such as is described in U.S. Patent Application entitled "Cathodic Electrocoat Having A Carbamate Functional Resin And A Carbamate Functional Reactive Additive", filed on the same day as the instant application.

Compounds suitable for use as reactive additive (C) are those having at least one primary carbamate group and at least one alkyl radical selected from the group consisting of straight chain alkyl groups of more than 10 carbons, branched alkyl groups of from 5 to 30 carbons, and mixtures thereof.

As used herein, "primary carbamate group" refers to the functional group having the structure

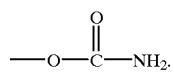

Thus, the primary carbamate group of the invention may be defined as a terminal or pendent carbamate group. Although compounds suitable for use as reactive additive (C) may comprise more than one primary carbamate group, it is most preferred that such compounds have one primary carbamate group.

In addition to the at least one primary carbamate group, compounds suitable for use as reactive additive (C) will further comprise at least one alkyl group selected from the group consisting of branched alkyl groups having from 5 to 30 total carbons, straight chain alkyl groups of more than 10 carbons, and mixtures thereof.

As used herein, the term "branched" refers to both lateral branches and forked branches. Lateral refers to a branch of two small chains at the end atom of a carbon chain. Forked refers to a branch of two small chains in the middle of a carbon chain. For the purposes of the instant invention a carbon chain may be from 1 to 15 carbons, more preferably from 1 to 8 and most preferably from 1 to 3. The total number of carbon atoms in the branched alkyl group is obtained by adding the total number of carbons in the main carbon chain+the number of carbons in all alkyl chains extending from the main carbon chain.

It will be appreciated that the main carbon chain may be from 1 to 25 carbons, preferably from 1 to 10, most preferably from 1 to 4. Most preferably, the main chain will be an aliphatic carbon chain free of unsaturation. Although the at least one branched alkyl group may comprise from 5 to 30 total carbons, more preferably, it will have from 5 to 15 carbons and most preferably from 8 to 12 carbons.

Finally, it will be appreciated that suitable "at least one alkyl groups" for use in reactive additive (C) will be substantially free of functional groups that are reactive with one or more of components (A) and (B). Thus, the at least one alkyl group selected from the group consisting of branched alkyl groups having from 5 to 30 total carbons, straight chain alkyl groups of more than 10 carbons, and mixtures thereof, will be free of hydroxyl groups and the like.

An example of an especially suitable at least one branched alkyl group is

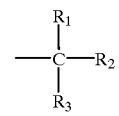

wherein $R_1$, $R_2$, and $R_3$ are alkyl groups of from 1 to 10 carbons each, preferably aliphatic groups of from 1 to 10 carbons. Most preferably, $R_1$, $R_2$, and $R_3$ will total from 8 to 12 carbons with at least one of $R_1$, $R_2$, and $R_3$ being a methyl group.

In another suitable branched alkyl group of the same structure, one of $R_1$, $R_2$, and $R_3$, may be hydrogen, with the other substituent groups being alkyl groups of from 1–10 carbons, preferably aliphatic groups of from 1 to 10. An example of such a group is

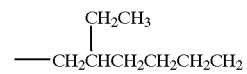

In this instance, the above structure is understood to be an example of lateral branching.

In a particularly preferred embodiment, the at least one branched alkyl group will comprise

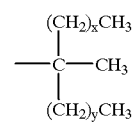

wherein x+y=5 carbons.

Alternatively, the compound suitable for use as reactive additive (C) may include a straight chain alkyl group of more than 10 carbons, preferably more than 15 carbons and most preferably more than 18. Examples of suitable straight chain, aliphatic alkyl groups include 1-eicosanyl, 1-octadecyl, 1-arachidyl, 1-dodecyl, 1-decyl, and 1-octyl, and the like. It is most preferred that compounds suitable for use as reactive additive (C) include at least one group which is a branched alkyl group such as described above.

Compounds suitable for use as reactive additive (C) may further include heteroatoms such as O and N, most preferably O. Such heteroatoms may be incorporated in the form of groups such as esters, hydroxyls, ether, carboxyls, mixtures thereof and the like. Preferred are esters, hydroxyls, and mixtures thereof. Most preferably, a compound will comprise at least one hydroxyl group and one ester group in addition to the carbamate functional group and the at least one alkyl group. As indicated above, such heteroatoms may not be present in the branched alkyl group nor in the straight alkyl chain group of more than 10 carbons.

Particularly suitable compounds for use as reactive additive (C) are those having the formula:

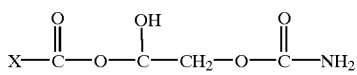

wherein X is a branched alkyl radical of from 5 to 30 total carbons, more preferably from 5 to 15 total carbons and most preferably from 8 to 12 total carbons.

A more preferred compound for use as reactive additive (C) is that having the formula:

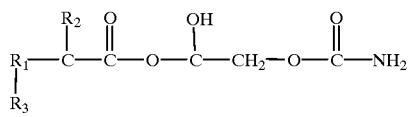

wherein $R_1$, $R_2$, and $R_3$ are each alkyl groups of from 1 to 10 carbons, especially compounds wherein $R_1$, $R_2$, and $R_3$ total from 8 to 12 carbons with at least one of $R_1$, $R_2$, and $R_3$ being a methyl group.

The most preferred compound for use as reactive additive (C) is that having the formula:

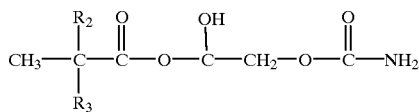

wherein $R_2$ and $R_3$ are respectively $-(CH_2)_xCH_3$ and $-(CH_2)_yCH_3$ wherein $x+y=5$.

Besides water, the aqueous medium of curable coating composition (I) may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

The curable coating composition (I) may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Curable coating composition (I) can contain optional ingredients such as wetting agents, surfactants, defoamers, antioxidants, WV absorbers, light stabilizers, and so forth.

Examples of surfactants and wetting agents include alkyl imidazolines such as those available from Ciba-Geigy Industrial Chemicals as Amine C®, acetylenic alcohols available from Air Products and Chemicals as Surfynoll® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion of curable coating composition (I) has a solids content of more than 20, preferably more than 30% by weight.

The curable coating composition (I) should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

The curable coating composition (I) will be applied on a conductive substrate by the electrodeposition coating process at a nonvolatile content of 10 to 25% by weight to a dry film thickness of 15 to 35 microns. Electrodeposition of the coating preparations according to the invention may be carried out by any of a number of processes known to those skilled in the art. The deposition may be carried out on all electrically conducting substrates, for example metal, such as steel, copper, aluminum and the like.

The curable coating composition (I) will not be immediately cured as in traditional prior art electrocoat processes. Rather, the curable coating composition will be maintained in a substantially uncured state. As used herein, the term "uncured" refers to a coating which has not been subjected to conditions sufficient to initiate crosslinking of the compound (a) and curing agent (b). However, it is within the scope of the instant claimed method that curable coating composition (I) be exposed to conditions sufficient to effect removal of water from curable coating composition (I). It is preferred that applied curable coating composition (I) be subjected to a 'water removal flash' of either an IR source or to a condition of elevated heat. Conditions of elevated heat are most preferred. If traditional elevated heat is employed, the applied curable coating composition may be subjected to temperatures of from 60 to 120° C. for a period of from 1 to 10 minutes, most preferably from 90 to 110° C. for a period of from 1 to 3 minutes. Sources of elevated heat are traditional baking ovens and blackwall radiation. Traditional baking ovens such as are well known in the art are most preferred.

The curable coating composition (II) may then be applied to the applied but uncured curable coating composition (I). Application of curable coating composition may be done via known application methods such as spraying, electrophoretic deposition, powder slurry spray application, powder coating via fluidized bed or the like. However, spray application of curable coating composition (II) is most preferred.

Curable coating composition (II) may a primer, sealer, basecoat, topcoat, or a mixture thereof. Most preferably, composition (II) will be a primer or sealer composition. Aqueous compositions or those having low concentrations of volatile organic compounds (VOC) such as powder coatings and powder slurry coatings are preferred. In a most preferred embodiment, curable coating composition (II) will be an aqueous powder slurry composition.

Curable coating composition (II) will comprise a compound (a) comprising one or more active hydrogen-containing groups and a curing agent (b) comprising one or more groups reactive with active hydrogen-containing groups. It will be appreciated that the composition of curable coating composition (II) is not restricted so long as the requirement with respect to curing agents (I) and (II) is met, i.e., that curing agents (I) and (II) be essentially interchangeable as discussed above and below.

Examples of suitable compounds (a) for use in curable coating composition (II) include all well known polymers and/or resins such as acrylics, polyesters, epoxys, polyurethanes, vinyl, polycarbonates, alkyds, polysiloxanes, and mixtures and copolymers thereof. Acrylic, polyurethane, and polyester resins and mixtures thereof, are preferred, with acrylic, polyurethane and mixtures thereof being most preferred. The one or more active hydrogen sites may thus be selected from the group consisting of hydroxyl, carboxylic acid, epoxy, carbamate, isocyanate, amine, acrylate, vinyl, silane, acetoacetate, mixtures thereof, and the like. Hydroxyl groups are most preferred.

A most preferred compound (a) for curable coating composition (II) will comprise a combination of a polyurethane polymer and an acrylic polymer. The polyurethane polymer will most preferably have a glass transition temperature of 0° C. or less. The acrylic polymer will most preferably have a glass transition temperature that is at least about 20° C. higher than the glass transition temperature of polyurethane resin.

The polyurethane polymer preferred for use as compound (II)(a) has a glass transition temperature of about 0° C. or less, preferably about −20° C. or less, and more preferably about −30° C. or less. The glass transition temperature of the polyurethane is in the range of from about −80° C. to about 0° C., more preferably from about −65° C. to about −10° C., still more preferably from about −65° C. to about −30° C., and even still more preferably from about −60° C. to about −35° C.

The weight average molecular weight of the polyurethane preferred for use as compound (II)(a) is preferably from about 15,000 to about 60,000, more preferably from about 15,000 to about 60,000, and even more preferably from about 20,000 to about 35,000.

Polyurethanes are prepared by reaction of at least one polyisocyanate and at least one polyol. The reactants used to prepare the polyurethane are selected and apportioned to provide the desired glass transition temperature. Suitable polyisocyanates include, without limitation, aliphatic linear and cyclic polyisocyanates, preferably having up to 18 carbon atoms, and substituted and unsubstituted aromatic polyisocyanates. Illustrative examples include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanates (e.g., 2,4-toluene diisocyanate and 2,6-toluene diisocyanate) diphenylmethane 4,4'-diisocyanate, methylenebis-4,4'-isocyanatocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, and combinations of two or more of these. Biurets, allophonates, isocyanurates, carbodiimides, and other such modifications of these isocyanates can also be used as the polyisocyanates. In a preferred embodiment, the polyisocyanates include methylenebis-4,4'-isocyanatocyclohexane, 1,6-hexamethylene diisocyanate, 1,12-dodecamethylene diisocyanate, and combinations thereof. It is particularly preferred to use at least one α,ω-alkylene diisocyanate having four or more carbons, preferably 6 or more carbons, in the alkylene group. Combinations of two or more polyisocyanates in which one of the polyisocyanates is 1,6-hexamethylene diisocyanate are especially preferred.

The polyol or polyols used to prepare the polyurethane polymer can be selected from any of the polyols known to be useful in preparing polyurethanes, including, without limitation, 1,4-butanediol, 1,3-butanediol, 2,3-butanediol, 1,6-hexanediol, neopentyl glycol, 1,3-propanediol, 1,5-pentanediol, 1,6-hexanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, thiodiglycol, 2,2,4-trimethyl-1,3-pentanediol, cyclohexanediols, trimethylolpropane, trimethylolethane, and glycerin; polyester polyols such as the reaction products of any of the foregoing alcohols and combinations thereof with one or more polycarboxylic acids selected from malonic acid, maleic acid, succinic acid, glutaric acid adipic acid, azelaic acid, anhydrides thereof, and combinations thereof; polyether polyols, such as polyethylene glycols and polypropylene glycols; and combinations of such polyols. Polyols having two hydroxyl groups are preferred. The polyurethane is preferably prepared using one or more polyester polyols. In a preferred embodiment, the polyester polyol is the reaction product of a mixture that comprises neopentyl glycol and adipic acid.

While it is possible to prepare a nonionic dispersion of the polyurethane, the polyurethane dispersion used as part of most preferred compound (II)(a) is preferably anionic. Acid-functional polyurethanes that can be salted to form anionic dispersions or emulsions may be synthesized by including a monomer having acid functionality, such as, without limitation, dialkylpropionic acids including dimethylolpropionic acid, and alkali metal salts of amino acids such as taurine, methyl taurine, 6-amino caproic acid, glycine, sulfanilic acid, diamino benzoic acid, ornithine, lysine and 1:1 adducts of sultones, such as propane sultone or butane sultone, with diamines, such as ethylene diamine, hydrazine, or 1,6-hexamethylene diamine. The hydroxyl groups react to form the urethane linkages while the acid group remains unreacted in the polyurethane polymerization.

Suitable polyurethane polymers can be prepared by any of the known methods. In one method for preparing polyurethane polymers, the polyisocyanate component is reacted with an excess of equivalents of the polyol component to form a hydroxyl-functional polyurethane polymer. Alternatively, an excess of equivalents of the polyisocyanate component can be reacted with the polyol component to form an isocyanate-functional prepolymer. The prepolymer can then be reacted further in different ways. First, the prepolymer can be reacted with a mono-functional alcohol or amine to provide a non-functional polyurethane polymer. Examples of mono-functional alcohols and amines that may be used include polyethylene oxide compounds having one terminal hydroxyl group, lower mono-functional alcohols having up to 12 carbon atoms, amino alcohols such as dimethylethanolamine, and secondary amines such as diethylamine and dimethylamine. Secondly, the prepolymer can be reacted with a polyfunctional polyol, polyamine, or amino alcohol compound to provide reactive hydrogen functionality. Examples of such polyfunctional compounds include, without limitation, the polyols already mentioned above, including triols such as trimethylolpropane; polyamines such as ethylenediamine, butylamine, and propylamine; and amino alcohols, such as diethanolamine. Finally, the prepolymer can be chain extended by the water during emulsification or dispersion of the prepolymer in the aqueous medium. The prepolymer is mixed with the water after or during neutralization.

The polyurethane preferred as part of compound (I)(a) may be polymerized without solvent. Solvent may be included, however, if necessary, when the polyurethane or prepolymer product is of a high viscosity. If solvent is used, the solvent may be removed, partially or completely, by distillation, preferably after the polyurethane is dispersed in the water. The polyurethane may have nonionic hydrophilic groups, such as polyethylene oxide groups, that serve to stabilize the dispersed polyurethane polymer. In a preferred embodiment, however, the polyurethane polymer is prepared with pendant acid groups as described above, and the acid groups are partially or fully salted with an alkali, such as sodium or potassium, or with a base, such as an amine, before or during dispersion of the polyurethane polymer or prepolymer in water.

In the most preferred embodiment, compound (II)(a) will also include an acrylic polymer. The acrylic polymer is prepared according to usual methods, such as by bulk or solution polymerization followed by dispersion in an aqueous medium or, preferably, by emulsion polymerization in an aqueous medium. The acrylic polymer is polymerized from a monomer mixture that preferably includes an active hydrogen-functional monomer and preferably includes an acid-functional monomer. Examples of active hydrogen-functional monomers include, without limitation, hydroxyl-functional monomers such as hydroxyethyl acrylate, hydroxyethyl methacrylate, hydroxypropyl acrylate, hydroxypropyl methacrylate, hydroxybutyl acrylates, and hydroxybutyl methacrylates; and carbamate- and urea-functional monomers or monomers with functional groups that are converted to carbamate or urea groups after polymerization such as, without limitation, those disclosed in U.S. Pat. No. 5,866,259, "Primer Coating Compositions Containing Carbamate-Functional Acrylic Polymers," the entire disclosure of which is incorporated herein by reference. Preferably, a sufficient amount of active hydrogen-functional monomer is included to produce an equivalent weight of 1000 or less grams per equivalent, more preferably 800 or less grams per equivalent, and even more preferably 600 or less grams per equivalent.

It is preferred that the acrylic polymer preferred for use as part of compound (II)(a) be dispersed as an anionic dispersion. Examples of suitable acid-functional monomers include, without limitation, $\alpha,\beta$-ethylenically unsaturated monocarboxylic acids containing 3 to 5 carbon atoms, $\alpha,\beta$-ethylenically unsaturated dicarboxylic acids containing 4 to 6 carbon atoms and the anhydrides and monoesters of these. Examples include, without limitation, acrylic acid, methacrylic acid, crotonic acid, maleic acid or maleic anhydride, itaconic acid or itaconic anhydride, and so on. A sufficient amount of acid-functional monomer is included to produce an acrylic polymer with an acid number of at least about 1, and preferably the acrylic polymer has an acid number of from about 1 to about 10.

In addition to the ethylenically unsaturated monomer having acid functionality or used to generate acid functionality in the finished polymer, one or more other ethylenically unsaturated monomers are employed as comonomers in forming the acrylic resins preferably used in compound (II)(a). Examples of such copolymerizable monomers include, without limitation, derivatives of $\alpha,\beta$-ethylenically unsaturated monocarboxylic acids containing 3 to 5 carbon atoms, including esters, nitriles, or amides of those acids; diesters of $\alpha,\beta$-ethylenically unsaturated dicarboxylic acids containing 4 to 6 carbon atoms; vinyl esters, vinyl ethers, vinyl ketones, vinyl amides, and aromatic or heterocyclic aliphatic vinyl compounds. Representative examples of acrylic and methacrylic acids, amides and aminoalkyl amides include, without limitation, such compounds as acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylarnide, 1-(N,N,-dimethylamino)-propyl-(3)-acrylamide and 1-(N,N-dimethylamino)-hexyl-(6)-methacrylamide.

Representative examples of esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobomyl acrylates, methacrylates, and crotonates; and polyalkylene glycol acrylates and methacrylates.

Representative examples of other ethylenically unsaturated polymerizable monomers include, without limitation, such compounds as fuimaric, maleic, and itaconic anhydrides, monoesters, and diesters. Polyfunctional monomers may also be included to provide a partially crosslinked acrylic dispersion. Examples of polyfunctional compounds include, without limitation, ethylene glycol diacrylate, ethylene glycol dimethacrylate, triethylene glycol diacrylate, tetraethylene glycol dimethacrylate, 1,6-hexanediol diacrylate, divinylbenzene, trimethylolpropane triacrylate, and so on.

Representative examples of vinyl monomers that can be copolymerized include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, $\alpha$-methyl styrene, vinyl toluene, tert-butyl styrene, and 2-vinyl pyrrolidone.

After polymerization, the acid functionality is salted, preferably with an alkali or base, preferably an amine. Example of suitable salting materials include, without limitation, ammonia, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine propylenediamine, ethylethanolamine, dimethylethanolamine, diethylethanolamine, 2-amino-2-methylpropanol, and morpholine. Preferred salting materials include 2-amino-2-methylpropanol and dimethylethanolamine.

The acrylic polymers preferably used in most preferred compound (II)(a) may be prepared as solutions in an organic solvent medium, preferably selected from water-soluble or water-miscible organic solvents, and then dispersed into water. After dispersion into water, the organic solvent can be distilled from the aqueous dispersion or emulsion.

In a preferred method, the acrylic polymer preferred for use as compound (II)(a) is provided by emulsion polymerization. Preferably, a nonionic or an anionic surfactant is used for the emulsion polymerization. Suitable surfactants include, without limitation, polyoxyethylenenonylphenyl ethers, polyoxyethylenealkylallyl ether sulfiic acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate.

The polymerization typically proceeds by free radical polymerization. The free radical source is typically supplied by a redox initiator or by an organic peroxide or azo compound. Useful initiators include, without limitation, ammonium peroxydisulfate, potassium peroxydisulfate, sodium metabisulfite, hydrogen peroxide, t-butyl hydroperoxide, dilauryl peroxide, t-butyl peroxybenzoate, 2,2'-azobis(isobutyronitrile), and redox initiators such as ammonium peroxydisulfate and sodium metabisulfite with ferrous ammonium sulfate. Optionally, a chain transfer agent may be used. Typical chain transfer agents include mercaptans such as octyl mercaptan, n- or tert-dodecyl mercaptan, thiosalicylic acid, mercaptoacetic acid, and mercaptoethanol; halogenated compounds; and dimeric alpha-methyl styrene.

Acrylic polymers prepared by emulsion polymerization can have weight average molecular weights of one million or more. The weight average molecular weight of the acrylic dispersion is preferably from about 5,000 to about 5,000,000, more preferably from about 7500 to about 500,000, and even more preferably from about 10,000 to about 50,000. If prepared by solution polymerization and then dispersed in water, the acrylic polymer will generally have a number average molecular weight of from about 5000 to about 60,000. The molecular weight can be determined by gel permeation chromatography using a polystyrene standard or other known methods.

The theoretical glass transition temperature of the acrylic polymer can be adjusted according to methods well-known in the art through selection and apportionment of the comonomers. The acrylic polymer has a glass transition temperature that is at least about 20° C. higher than the glass transition temperature of polyurethane resin. Preferably, the acrylic polymer has a glass transition temperature that is at least about 40° C. higher, more preferably about 50° C. higher, than the glass transition temperature of polyurethane resin. In a preferred embodiment, the theoretical $T_g$ of the acrylic polymer is between about −30° C. and 80° C., more preferably between about −20° C. and 40° C.

In the most preferred compound (II)(a), the polyurethane polymer will be included in compound (II)(a) in an amount of at least about 40% by weight, preferably at least about 50% by weight, based on the total nonvolatile weight of compound (II)(a). The polyurethane polymer may be included in compound (II)(a) in an amount of up to about 98% by weight, preferably up to about 80% by weight, based on the total nonvolatile weight of compound (II)(a). It is preferred to include from about 50% by weight to about 75% by weight, and even more preferred to include from about 65% by weight to about 75% by weight, of the polyurethane polymer, based on the total nonvolatile weight of compound (II) (a).

Curable coating composition (II) will further comprise a curing agent (b). Curing agent (b) is a compound having a plurality of functional groups that are reactive with the active hydrogen-containing groups on compound (a). Such reactive groups include active methylol or methylalkoxy groups, isocyanate groups, siloxane groups, cyclic carbonate groups, and anhydride groups. Examples of compounds suitalble for use as curing agent (II)(b) include aminoplast resins, phenol/formaldehyde adducts, blocked isocyanate curing agents, tris(alkoxy carbonylamnino) triazines (available from Cytec Industries under the tradename TACT) and mixtures thereof. Aminoplast resins and phenol/formaldehyde adducts are most preferred, with blocked isocyanates being disfavored. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble.

The curing agent (I)(b) may generally be present in curable coating composition in an amount of from 1 to 50% by weight, preferably from about 2% by weight to about 30% by weight, more preferably from about 5% by weight to about 20% by weight, and particularly preferably about 5% to about 15% by weight of the total nonvolatile weight of compound (II)(a) and curing agent (II)(b).

It is a necessary aspect of the instant invention that the curing agents of the respective coatings (I) and (II) be essentially interchangeable. That is, curing agent (I) must be such that it would cure curable coating composition (I) under the applied cure conditions, if it were substitued in place of curing agent (II). Similarly, curing agent (II) must be such that it would cure curable coating composition (I) under the applied cure conditions, if it were substitued in place of curing agent (I). While it is not necessary that curing agent (I) and curing agent (II) be identical, it is preferred that they possess the same reactive groups. Most preferably, the curing agents (I) and (II) will be the same. Accordingly, curable coating compositions (I) and (I) must be selected so as to satisfy this requirement.

In a preferred embodiment, the curable coating compositions (I) and (II) will both further comprise a catalyst (c) for the reaction between reactive compound (a) and curing agent (b), wherein the catalyst (I)(c) is also a catalyst for the reaction between reactive compound (II)(a) and curing agent (II)(b), and the catalyst (II)(c) is also a catalyst for the reaction between reactive compound (I)(a) and curing agent (I)(b). The phrase "is also a catalyst for" is meant to indicate that said catalyst changes the speed of the other reaction as well as the reaction for which it is originally intended to be catalytic. That is, catalyst (I)(a) will, under the applied curing conditions, change the speed of the reaction (I)(a)+(I)(b), as well as change the speed of the reaction (II)(a)+

(II)(b). Likewise, catalyst (II)(c) will, under the applied curing conditions, change the speed of the reaction (II)(a)+ (II)(b), as well as change the speed of the reaction (I)(a)+ (I)(b).

The curable coating composition (II) may thus contain one or more catalyst(s) to facilitate the reaction between compound (a) and curing agent (b). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. The necessary acid to catalyze the desired reaction of compound (II)(a) and curing agent (II) may also be provided by the acid functional groups of compound (II)(a). Other catalysts useful in the composition of the invention include Lewis acids, zinc salts, and tin salts. Illustrative Lewis acids or zinc salts are zinc nitrate, zinc acetate, bismuth octoate, dibutyltin dilaurate, and the like. Such catalysts will typically be used in an amount of from 0.1 to 3.0 weight percent, based on the resin solids, preferably from 0.5 to 2.0 weight percent, based on the resin solids. A most preferred catalyst for use in curable coating composition (II) of the invention is an acid catalyst such as a DDBSA, either blocked or unblocked.

Curable coating composition (II) may be a solvent or aqueous based coating, including but not limited to, an aqueous powder slurry composition. Also, the coating composition (II) can be applied without solvent, in the case of a powder coating. However, in many cases, it is desirable to use a solvent in the coating composition. This solvent should act as a solvent with respect to compound (a) and curing agent (b). In general, depending on the solubility characteristics of components (a) and (b), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, amyl acetate, ethylene glycol butyl ether-acetate, propylene glycol monomethyl ether acetate, xylene, N-methylpyrrolidone, or blends of aromatic hydrocarbons. In another embodiment, the solvent can be water or a mixture of water with co-solvents.

In some preferred embodiments, curable composition (II) will be an aqueous coating composition. Besides water, the aqueous medium of curable coating composition (II) may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

In a particularly most preferred embodiment, the curable coating composition (II) will have a very low content of volatile organic solvent. In an especially preferred embodiment, the curable coating composition (II) will be an aqueous powder slurry composition. In such an embodiment, the polyurethane dispersion used as part of compound (II)(a) will be preferably prepared as a solvent free or substantially solvent free dispersion. By "substantially solvent free" it is meant that the dispersion has a volatile organic content of less than about 5% by weight of the primer composition. The acrylic dispersion also used in compound (II)(a) will also be preferably solvent free or substantially solvent free dispersion. In this most preferred embodiment, the curable coating composition (II) will preferably have a VOC of less than about 1.5, more preferably less than about 1.3, and even more preferably less than about 0.7. The VOC of a coating composition is typically measured using ASTM D3960.

The curable coating composition (II) may further contain pigments such as are commonly used in the art, such as color pigments, corrosion inhibiting pigments, conductive pigments, and filler pigments. Suitable examples include, without limitation, titanium dioxide, metal oxides such as ferric oxide, carbon black, silicates such as aluminum silicate and basic lead silicate, sulfates such as precipitated barium sulfate, molybdates such as aluminum phosphomolybdate, chromates such as strontium chromate and lead chromate, phosphates, silicas, and mixtures thereof. The pigment-to-resin weight ratio can be important and should be preferably less than 50:100, more preferably less than 40:100, and usually about 10 to 30:100.

In a most preferred embodiment, the curable coating composition (II) will be tinted so as to have a color which corresponds to a subsequently applied basecoat. The use of a tinted primer or sealer allows for the application of lower basecoat film builds.

Curable coating composition (II) can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

After application of curable coating composition (II) onto substantially uncured or wet curable coating composition (I), the wet-on-wet composite of curable coating composition (I) and curable coating composition (II) may and most preferably will be cured at an elevated temperature, depending upon the nature of particular base resins. In general, depending upon the nature of the compositions utilized as curable coating compositions (I) and (II), the wet-on-wet composite will be cured by exposure to temperatures in the range of from 100 to 200° C., preferably from 120 to 180° C., and most preferably from 135 to 155° C. However, it will be appreciated that other cure conditions such as exposure to IR and blackwall radiation may also be used to crosslink the two curable coating compositions.

Although prior art cathodic electrodeposition coating typically cure at approximately 20 minutes at 176° C. (metal temperature), the preferred anodic and cathodic curable coating compositions (I) discussed above generally cure at lower temperatures. The preferred anodic curable coating composition (I) will generally cure upon approximately 30 to 15 minutes, most preferably 20 minutes, exposure to 135° C., most preferably 110° C. In the most preferred embodiment, the most preferred cathodic electrodeposition coating composition discussed above will be used as curable coating composition (I) and will cure at 30 to 15 minutes, preferably 20 minutes, at 154° C. or less (metal temperature), preferably at 20 minutes at 135° C. (metal temperature). Therefore, in the most preferred embodiment of the invention, the wet-on-wet composite of both curable coating composition (I) and curable coating composition (II) will be cured at a temperature of from 120 to 180° C., most preferably from 135 to 155° C., for a time of from 5 to 40 minutes, most preferably from 15 to 25 minutes.

EXAMPLE 1

Preparation of a Polymer (A) for use as Compound (I)(a)

Part (i)

Preparation of Polymer Intermediate (A') and Reactive Additive (Ac')

To a 1 liter round bottom 4-neck flask set up with an addition funnel, condenser, temperature probe and mixing shaft was added 333.5 grams (1.5 moles) of isophorone diisocyanate (IPDI), 0.5 grams of dibutyltindilaurate and 152.0 grams of MIBK (methyl isobutyl ketone-urethane grade/dry). A total of 232.1 grams (1.95 moles) of hydroxypropyl carbamate (HPC) was added to the addition funnel. The HPC from the addition funnel was added to the flask at such a rate that the temperature was maintained at 34° C. to 40° C. The temperature was then maintained at 40° C. for three hours and the NCO content was verified by titration to be 682 grams product/eq NCO. (539 g solid/eq NCO). The final product was 78.8% solid content and contained 2 moles of carbamate functional intermediate (A') to 1 mole of "in-situ" generated carbamate reactive intermediate (Ac').

Part (ii)

Preparation of Polymer (A)

To a 3000 ml flask equipped with a mixer, condenser and temperature probe were added 376.0 g diglycidyl ether of bisphenol A (1 mole at EEW=188), 153.9 g bisphenol A (0.675 moles), 52.4 g dodecylphenol (0.2 moles) and 30.7 g xylene. The reaction was heated to 125° C. and 0.4 g of triphenylphosphine were added. The reaction was exothermic and the temperature was maintained at 150° C. for 1 hour and the weight per epoxy was confirmed to be 1263 g solid/eq. epoxy. The batch was cooled from 150° C. to 95° C. by the addition of 100.0 grams of MIBK. At 95C, 300.0 g of the carbamate functional intermediate from Ex 1, part (i) above was added. The reaction temperature was maintained at 95C for 2.5 hours and the loss of isocyanate and completion of the graft reaction was confirmed by titration. At 95° C., 73.8 grams of a mixture of 27.6 grams (0.31 moles) of dimethylethanolamine, 37.8 grams of lactic acid (86%) and 36.0 grams of water were added. The temperature of the reaction was then maintained at 95° C. for 3 hours. The resin was diluted with 41.5 grams of propylene glycol phenyl ether and 41.5 grams ethylene glycol butyl ether and cooled to 60° C. The resin was 75% solids and had a molecular weight (Mw) of 4654 as measured by by gel permeation chromatography. The resin has a carbamate equivalent weight of 1079 grams solid resin/equivalent carbamate. The meq Quat/gram NV is 0.352.

EXAMPLE 2

Preparation of a curable coating composition (I)

500.0 grams of the reaction product of Example 1 above, 230.9 grams of a butylated melamine resin (Monsanto Resimine 7539), 54.6 grams of the reactive additive (C) of Example 1, 23.0 grams of ethylene glycol butyl ether, 23.0 grams of propylene glycol phenyl ether were added to a one gallon vessel. This was mixed until homogenous. 8.3 grams of bismuth octocate catalyst and 5.5 grams of zinc nitrate catalyst were then added. A total of 1109 grams deionized water was added in portions with good mixing. The resulting emulsion had a solids content of 25%. Additonal DI water was added to reduced the viscosity and the organic solvent was allowed to strip from the stirred emulsion for one day. After one day, the stripped emulsion had a viscosity of 35 cps and was 23% solids. The pH was 5.2 and the conductivity was 1231 micromhos. The emulsion had a particle size of 1.52 microns. The meq Quat content was 0.29 meq quaternary anmmonium sites/gram solid.

EXAMPLE 3

Preparation of a Cathodic Electrocoat Bath Using the Cationic Curable Coating Composition (I)

Part (i)

Preparation of a Grey Pigment Paste

To a tank were added the following materials in order, 2,624.2 parts of deionized water and 1,879.60 parts of a urethane epoxy resin solution prepared in accordance with Example II of U.S. Pat. No. 4,007,154. The materials were mixed for a minimum of ten minutes and the following added under low agitiation, 38.50 parts of K-2000 additive, commercially available from Byk-Chemie, 127.20 parts of a black pigment, 217.9 parts of dibutyl tin oxide and 254.2 parts of lead silicate. The mixing speed was increased to high and the paste mixed for a minimum of ten minutes. 90.8 parts of clay-aluminum silicate was added. High speed mixing was maintained while 4,213 parts of white $TiO_2$ were added. The paste was mixed for a minimum of 45 minutes. Deionized water was added to obtain a viscosity of 75–85 Kreb units.

Part (ii)

Preparation of a Cathodic Electrocoat Bath.

To a gallon vessel were added 2391 grams of principal emulsion of Example 2 above and 150.0 grams of the grey pigment paste from Ex 3, part (i) above. The bath was diluted with 709 grams DI water. The bath had a pigment/binder ratio of 0.12 and a solids content of 20%. The bath was mixed for 2 hours in an open vessel. The bath had a pH of 5.4 and a conductivity of 642 micromhos.

EXAMPLE 4

Preparation of a Curable Coating Composition (II)

A primer composition was prepared by first mixing together 17.51 parts by weight of BAYHYDROL 140 AQ polyurethane dispersion (about 40% nonvolatile, 59% water, and 1% toluene, glass transition temperature of about −45° C., pH of about 6.0 to about 7.5, weight average molecular weight of about 25,000, anionic Desmodur W/1,6-hexamethylene diisocyanate/polyester polyol-based polyurethane, available from Bayer Corporation, Pittsburgh, Pa.), 16.27 parts by weight of an emulsion of an acrylic polymer (glass transition temperature of 20° C., nonvolatile content of about 41% in water, acid number of about 8 mg KOH/g nonvolatile, hydroxyl equivalent weight of 510, salted with 2-amino-2-methylpropanol to a pH of about 6 to 7), 20.9 parts deionized water, and 40.89 parts by weight of pigment paste (63% by weight nonvolatile in water, nonvolatiles are 33.1% by weight of BAYHYDROL 140 AQ polyurethane resin, 33.1% by weight of titanium dioxide, 33.1% by weight of barium sulfate extender, and the balance carbon black, ground on a horizontal mill to a fineness of 6 microns). To this mixture were added 2.71 parts by weight of RESIMENE 747 (a melamine formaldehyde resin available from Solutia, St. Louis, Mo.) and 0.27 parts by weight of ABEX EP 110 (anionic surfactant available from Rhodia). A total of 1.39 parts by weight of an additive package (defoamer, wetting agent, and thickener) was then added. Finally, the pH of the primer composition was adjusted to about 8.0 with 2-amino-2-methylpropanol.

The measured volatile organic content of the primer composition was 0.24 pounds per gallon. The primer composition had a nonvolatile content of 42% by weight. The primer composition was adjusted before spray application with deionized water to a viscosity of 75 to 110 centipoise.

EXAMPLE 5

Deposition of Cathodic Electrocoat Coating Composition (I)

Using a DC rectifier a 4"×12" steel panels were coated via cathodic electrodeposition with the cathodic electrocoat bath of Example 3. The set voltage was 50 volts. The amps were set at 0.8 amps and the deposition time was 2.2 minutes. The bath temperature was 90° F. The target film build was 0.5 mils. The resulting panels were flashed for 5 minutes at 100 degrees C. After completion of the flash, the panels were then spray applied with the curable coating composition of Example 4. The resulting multilayer coating was then baked for 30 minutes at 150 degrees C. The target film build for curable coating composition (II) was 1.0 mils for a total dry film build of 1.5 mils. The 20°/60° gloss was respectively 15.8 and 60.1. The panel had some wrinkle and pop. Crosshatch adhesion was a pass. The multilayer film had less than 0.1% paint loss/excellent on the 1200 ml shot/chipping test.

I claim:

1. A method of making a cured multilayer coating, the method comprising
    applying by electrophoretic deposition a first curable coating composition (I) to a substrate, the first curable coating composition (I) comprising,
        (a) a compound comprising one or more active hydrogen-containing groups, and
        (b) a curing agent comprising one or more groups reactive with active hydrogen-containing groups,
    applying a second curable coating composition (II) to the applied first curable coating composition (I) while the applied first curable coating composition is in an uncured state, the second curable composition (II) comprising
        (a) a compound comprising one or more active hydrogen-containing groups, and
        (b) a curing agent comprising one or more groups reactive with active hydrogen-containing groups, and
    subjecting the applied first and second curable coating compositions to conditions sufficient to cause curing of both compositions,
    wherein curing agent (I)(b) is reactive with compound (II)(a) and curing agent (II)(b) is reactive with compound (I)(a) under the applied cure conditions.

2. The method of claim 1 wherein
    the first curable coating composition (I) further comprises (c) a catalyst for the reaction between reactive compound (I)(a) and curing agent (I)(b), and
    the second curable coating composition (II) further comprises (c) a catalyst for the reaction between reactive compound (II)(a) and curing agent (II)(b).

3. The method of claim 2 wherein
    the catalyst (I)(c) is also a catalyst for the reaction between reactive compound (II)(a) and curing agent (II)(b), and
    the catalyst (II)(c) is also a catalyst for the reaction between reactive compound (I)(a) and curing agent (I)(b).

4. The method of claim 1 wherein subjecting the applied first and second curable coating compositions to conditions sufficient to cause curing of both compositions occurs simultaneously.

5. The method of claim 4 wherein the applied first and second curable coating compositions are cured by being subjected to a temperature of 350 degrees C. or less for 30 minutes or less.

6. The method of claim 1 wherein curing agent (I)(b) is free of isocyanate groups.

7. The method of claim 6 wherein curing agent (I)(b) is free of blocked isocyanate groups.

8. The method of claim 1 wherein curing agent (I)(b) is aminoplast resin.

9. The method of claim 8 wherein curing agent (II)(b) is aminoplast resin.

10. The method of claim 1 wherein curing agent (II)(b) is aminoplast resin.

11. The method of claim 1 wherein the first curable coating composition (I) is an anodic electrocoat coating composition.

12. The method of claim 1 wherein the first curable coating composition (I) is a cathodic electrocoat coating composition.

13. The method of claim 1 wherein the second curable coating composition (II) is a waterborn coating composition.

* * * * *

UNITED STATES PATENT AND TRADEMARK OFFICE
CERTIFICATE OF CORRECTION

PATENT NO. : 6,342,144 B1  
DATED : January 29, 2002  
INVENTOR(S) : Timothy S. December It is certified that error appears in the above-identified patent and that said Letters Patent is hereby corrected as shown below:

<u>Title page,</u>  
Item [54], Title, after "AND" and before "FOR" please delete "PROCESSING", please insert -- PROCESS --;  
Item [73], Assignee, please delete "BASF Aktiengesellschaft", please insert -- BASF Corporation --;

<u>Column 32,</u>  
Line 41, after "claim", and before "wherein" please delete "8" and insert -- 1 --;  
Line 43, after "claim", and before "wherein" please delete "1" and insert -- 8 --.

Signed and Sealed this

Twenty-fourth Day of June, 2003

JAMES E. ROGAN  
*Director of the United States Patent and Trademark Office*